United States Patent
Hnizdor

[19]

[11] Patent Number: 6,122,856
[45] Date of Patent: *Sep. 26, 2000

[54] ARTIFICIAL FLY/LURE

[75] Inventor: Thomas A. Hnizdor, Redford, Mich.

[73] Assignee: B-17 Fly Tackle Limited, Redford, Mich.

[*] Notice: This patent is subject to a terminal disclaimer.

[21] Appl. No.: 09/314,084

[22] Filed: May 18, 1999

[51] Int. Cl.[7] .................................................. A01K 85/08
[52] U.S. Cl. .......................................... 43/42.25; 43/42.28
[58] Field of Search ................. 43/42.25, 42.26, 43/42.27, 42.28

[56] References Cited

U.S. PATENT DOCUMENTS

| | | | |
|---|---|---|---|
| Re. 14,377 | 10/1917 | Cox | 43/42.27 |
| D. 87,374 | 7/1932 | Weber | D22/128 |
| 633,797 | 9/1899 | Cantrell | 43/43.38 |
| 862,150 | 8/1907 | Fredricks | 43/41 |
| 882,882 | 3/1908 | Henzel | 4/44.82 |
| 975,833 | 11/1910 | Cox | 43/42.25 |
| 1,505,235 | 8/1924 | Archer | 43/44.8 |
| 1,522,185 | 1/1925 | Hawes | 43/42.16 |
| 1,540,586 | 6/1925 | Adam | 43/42.26 |
| 1,635,644 | 7/1927 | Sloan | 43/42.25 |
| 1,994,692 | 3/1935 | Davenport | 43/42.27 |
| 2,187,666 | 1/1940 | Schumann | 43/42.27 |
| 2,231,949 | 2/1941 | Rinehart | 43/42.27 |
| 2,242,708 | 5/1941 | Lancaster | 43/42.27 |
| 2,333,484 | 11/1943 | Miles | 43/42.33 |
| 2,423,431 | 8/1947 | Allen | 43/42.25 |
| 2,473,142 | 6/1949 | Gilmore | 43/42.26 |
| 2,611,985 | 9/1952 | Lloyd, Jr. | 43/42.25 |
| 3,133,371 | 5/1964 | Christensen | 43/42.25 |
| 3,568,354 | 3/1971 | Yacko | 43/41 |
| 3,774,335 | 11/1973 | Sisty | 43/42.25 |
| 4,163,337 | 8/1979 | Kress | 43/42.05 |
| 4,186,510 | 2/1980 | Kimerer, Jr. | 43/42.25 |
| 4,280,296 | 7/1981 | Volenec | 43/44.81 |
| 4,559,736 | 12/1985 | Sienkiewicz | 43/42.25 |
| 4,862,630 | 9/1989 | Welch | 43/42.26 |
| 4,914,852 | 4/1990 | Hnizdor | 43/44.82 |
| 4,965,957 | 10/1990 | Hnizdor | 43/44.82 |
| 5,094,026 | 3/1992 | Correll et al. | 43/42.28 |
| 5,394,637 | 3/1995 | Hnizdor | 43/43.16 |
| 5,524,380 | 6/1996 | Hnizdor | 43/42.47 |
| 5,628,140 | 5/1997 | Hnizdor | 43/43.16 |
| 5,953,850 | 9/1999 | Hnizdor | 43/42.26 |

OTHER PUBLICATIONS

Orvis Fishing and Outdoor Catalog 1997, Orvis Fly–Fishing & Rod Building 1997, p. 16B.
1998 Feather–Craft Fly Fishing Bulletin/Catalog, p. 40.
Orvis Fishing and Outdoor Catalog 1998, p. 89.
Orvis Fishing and Outdoor Catalog 1997, p. 75.

*Primary Examiner*—Michael J. Carone
*Assistant Examiner*—Darren W. Ark
*Attorney, Agent, or Firm*—Young & Basile, PC

[57] ABSTRACT

An artificial fly/lure includes a body mounted about the shank of a fish hook. The body is formed of an open mesh weave body secured at one end to the shank of a fish hook and at another point to the fish hook. A plurality of open mesh woven arms are secured at a first end to the shank of the fish hook interiorly within one end of the body. The arms project outwardly from the one end of the body to a freely movable second end. A flexible rod is interposed within each arm. The arms are movable with respect to the fixed first ends when the artificial fly/lure is drawn through the water, but return to their normal curved shape when a forward pulling force is discontinued.

10 Claims, 8 Drawing Sheets

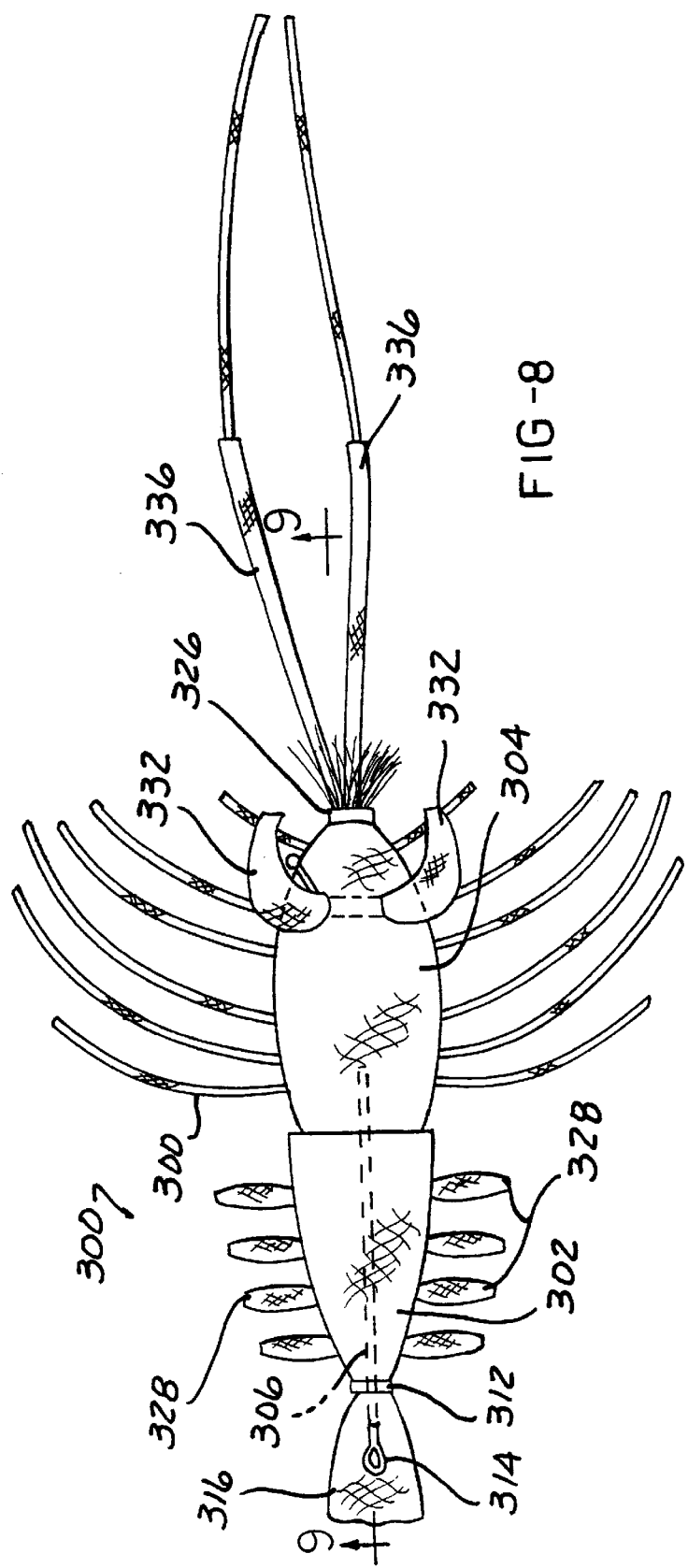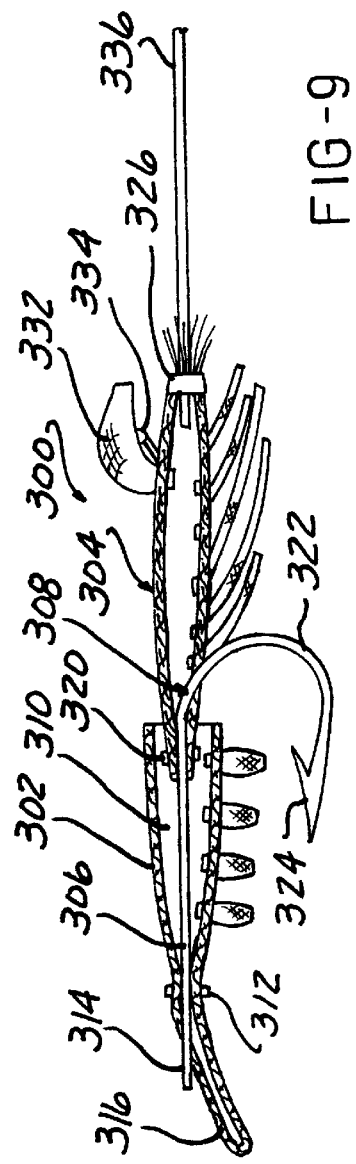

ARTIFICIAL FLY/LURE

CROSS REFERENCE TO CO-PENDING APPLICATION

This application discloses subject matter which is related to subject matter disclosed and claimed in U.S. patent application Ser. No. 09/035,579, filed Mar. 5, 1998, now U.S. Pat. No. 5,953,850 which is a continuation and a continuation-in-part of patent application Ser. No. 08/697,691, filed Sep. 5, 1996, now abandoned, which is a continuation of U.S. patent application Ser. No. 08/420,479, filed Apr. 12, 1995, now U.S. Pat. No. 5,628,140, issued May 13, 1997.

BACKGROUND OF THE INVENTION

1. Field of the Invention

The present invention relates, in general, to fishing equipment and, more specifically, to artificial flies and lures.

2. Description of the Art

Hundreds of fish hooks of many different sizes and shapes have been devised for specific purposes. Hook shape can vary in a number of different features or parts including, gap size, point type, bend shape and bend offset, to name a few, depending upon the type of fish being sought, fishing conditions, or the type of fishing, i.e., bait or fly fishing.

Artificial flies and lures have been formed in a shape to attract different species of fish. In the case of artificial flies, a fly simulating a natural fly, insect or small bait fish is mounted on a hook. Such flies typically comprise a buoyant body, feathers, etc. Other fly bodies have also been formed merely in an insect or bait fish attractor shape. Various colors and/or design patterns have also been placed on such flies to attract fish under certain light conditions, water visibility, etc.

In the case of flies, the skills and artistic effort involved in constructing and assembling the various components to form a complete fly commonly results in what approaches a work of art. Besides having an aesthetic appeal, such flies are also effective in attracting fish. However, certain species of fish have large numbers of sharp teeth which destroy a fly when struck by such fish. Since the cost of flies can range from $1 to $10 or more, it can become quite expensive for a fisherman who is successful in landing a large number of fish by using relatively expensive flies.

Woven braid or mesh material formed of interwoven strands of a plastic, such as nylon, has been used to form various parts of artificial flies, such as a crab or squid body. Various appendages associated with such naturally occurring creatures are attached to the woven braid body. Such features include features, antenna, straight pipe-shaped legs, antenna, etc. However, such features have not necessarily resulted in an artificial fly or lure which closely resembles the naturally occurring sea creature it is simulating, such as a crab, squid, etc.

Thus, It would be desirable to provide an artificial fly or lure which is inexpensive in cost while having excellent fish attractor characteristics. It would also be desirable to provide an artificial fly/lure which is effective as a fish attractor and at the same time has a tough outer layer which resists damage when stuck by the sharp teeth of a fish. It would also be desirable to provide an artificial fly or lure which can be constructed of different shapes simulating various crustaceans and/or mollusks, such as crabs, lobsters, and squid, wherein the bodies and the appendages of such members are formed of woven mesh material.

SUMMARY OF THE INVENTION

The present invention provides is an artificial fly/lure formed of an woven, mesh body and appendages which exhibits unique characteristics not previously found in similar artificial flies or lures.

According to one aspect of the present invention, the artificial fly comprises a hook having a shank, an eye at one end of the shank, and a bend and tip at another end of the shank, and a hollow body with sidewalls formed of a continuous open mesh of crisscrossed strands with apertures therebetween opening to a hollow interior of the body. The shank is disposed in the body with the bend and tip of the hook extending outward from one portion of the body and the eye of the shank extending outward from one end of the body.

A plurality of movable arms or members extend from the body. The arms are formed of a continuous, open mesh of crisscrossed strands with apertures therebetween opening to a hollow interior of each arm. In one aspect, a flexible rod extends through each of the arms. Opposite ends of the rod are fixed to opposite ends of each arm. The flexible rod has a length shorter than a nominal length of the arm to bend the arm into a curved shape between the opposed ends.

Each of the arms are fixedly mounted at a first end to the shank of the fish hook. The body is tied at a first end to the shank of the hook adjacent to the eye of hook. The body is also tied at an intermediate portion spaced from the second end.

A solid insert is disposed within the body between the body and the shank of the fish hook. The body conforms to the shape of the insert.

In this aspect of the invention, the artificial fly or lure is formed in the shape of a squid. The squid has a plurality of tentacles or arms projecting from one end which pulsate or move as the fishing line carrying the squid is pulled through the water in a jerky pattern.

The tentacles or arms are also formed of a hollow mesh material which has shape memory, but is capable of movement about the fixed first end as the squid is drawn through the water. One end of each tentacle or arm is fixedly secured to the shank. Each arm projects outwardly from the fixed first end through an open second end of the body to an opposite second end spaced from the second end of the body. A flexible rod is interposed within each arm and fixed to the first and second ends of the arm. The rod has an overall length shorter than the original length of each arm so as to cause each arm to bend in a smooth arcuate shape between the first and second ends to form a life-like appearing tentacle or arm.

In another aspect of the squid shaped fly/lure, two hooks are tied in tandem and arranged within an elongated body in the shape of a squid. The tentacles are fixedly attached at a first end to the rearmost or second hook. The bend and tip portions of each hook project exteriorly of the body in opposite directions.

In another aspect of the invention, the artificial fly includes a plurality of tubular appendages or legs joined to the body to form the likeness of a crustacean. In yet another embodiment, a first body is secured to the shank of the fish hook, with one end of the first body folded inward on itself to form a hollow interior surrounding a portion of the shank of the fish hook. A second body is fixedly mounted at one end to the shank of the fish hook, the second body being substantially axially in line with the first body.

The present invention presents several different artificial flies or lures, all of which are constructed of tubular mesh material which has been formed into various shapes simulating crustaceans, such as crabs or lobsters, or mollusks, such as squid, with the mesh material forming both the body and the appendages of such flies or lures. The use of the mesh material enables such artificial flies or lures to exhibit different actions in the water, such as floating on the surface, slowly drifting downward to the bottom of a lake or stream, moving along the bottom, or having pulsating or moving tentacles or arms as the fly or lure is drawn through the water in a series of jerk-like movements. All of these actions simulate the normal actions of a bait fish, crustacean, squid, etc.

BRIEF DESCRIPTION OF THE DRAWING

The various features, advantages and other uses of the present invention will become more apparent by referring to the following detailed description and drawing in which:

FIG. 8 is a plan view of an artificial spiny lobster constructed in accordance with the teachings of the present invention;

FIG. 9 is a cross-sectional view generally taken along line 9—9 in FIG. 8; and

DESCRIPTION OF THE PREFERRED EMBODIMENTS

The present invention is usable both as an artificial fly or as a lure depending upon the type of fishing gear that is used by fishermen, such as fly tackle or conventional spinning or trolling gear. Further, it will be understood that the terms "fly" and "lure" are to be used interchangeably with all aspects of the present invention. Thus, the following description of the present invention as an artificial fly will be understood to equally encompass the use of the present invention as a lure.

Figure 1:
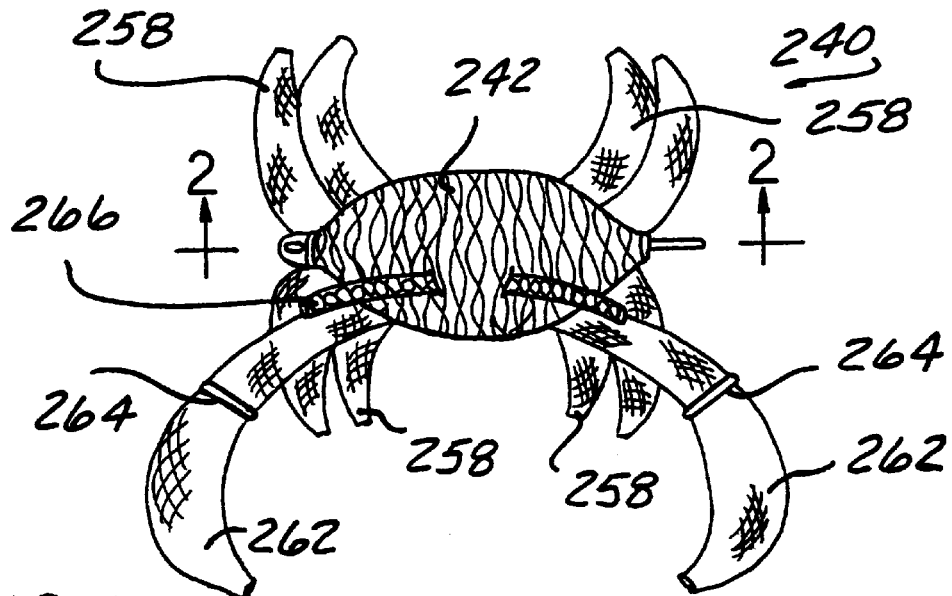
FIG. 1 is a plan view of one embodiment of an artificial crab constructed in accordance with the teachings of the present invention.
Figure 2:
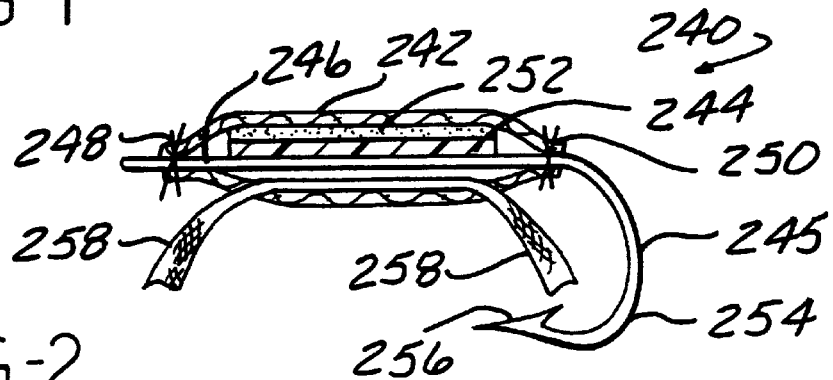
FIG. 2 is a cross-sectional view generally along line 2—2 in FIG. 1.
Figure 3:
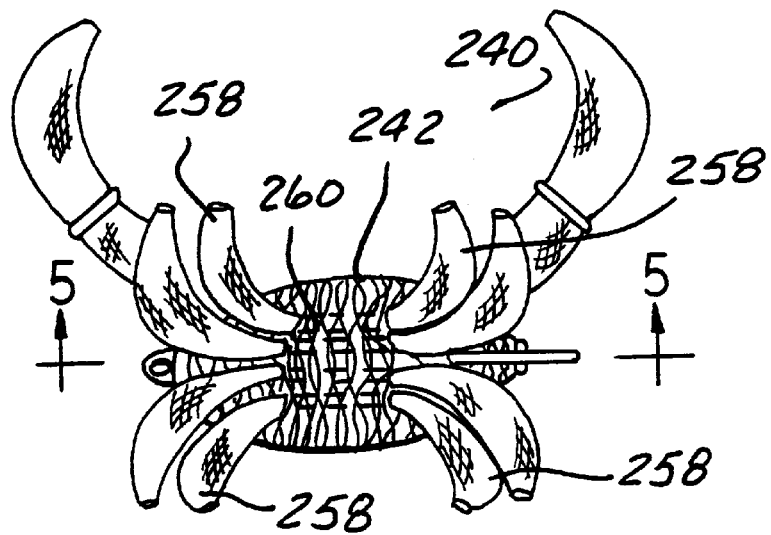
FIG. 3 is a bottom view of the artificial crab shown in FIG. 1.

Referring now to FIGS. 1–3, there is depicted another embodiment of an artificial fly/lure which is formed in the shape of a crab 240. The artificial fly/lure 240 includes a body 242 formed of the woven mesh material described above. A generally oval or circular disk 244, formed of a rigid plastic, is disposed in the interior of the body 242 to shape the body 242 to a generally oval shape shown in FIG. 1. The shank 246 of a hook is inserted through the open ends of the body 242 before the ends 248 and 250 are closed by means of threads wound around the ends 248 and 250 and covered by an adhesive or epoxy to fix the shank 246 of the hook in the body 242. As also shown in FIG. 2, an optional foam or resilient pad 252 is interposed within the interior of the body 242 between one layer of the body 242 and the disk 244. The bend 254 of the hook 245 projects downwardly to a tip 256 disposed below the underside of the body 240 when the body 240 is viewed in the normal use position shown in FIG. 1.

A plurality of legs are joined to the body 242 to simulate the legs of a crab. Four pairs 258 are joined to the body 242. The legs forming each pair of legs 258 are formed of the same mesh material used to form the body 242 except that the mesh tube is provided in a smaller diameter. As depicted in FIG. 3, the leg mesh in its initial elongated, tubular form is woven through the mesh forming the body 242 as indicated by reference number 260. Since the shorter length rod 259 is joined to the ends of the leg mesh 258, the rod 259 bends the leg mesh 258 into a curved shape as shown in FIGS. 1 and 3. The ends of each leg 258 are closed by means of heat or a drop of epoxy and joined to an end of a flexible rod 259 extending through each leg 258. The flexible member is preferably a monofilament fishing line with a length less than the length of the mesh forming each leg 258.

Two large pinchers 262 are also joined to the body 242 by weaving an elongated tubular member through the underside of the body 242 as shown in FIG. 3. The pinchers 262 are formed in an arcuate, curved shape shown in FIGS. 1 and 3 by a flexible rod 263 extending therethrough as in the legs 258. A simulated joint 264 is formed in each pincher, and optionally in the leg 258, by folding the mesh material forming each pincher 262 back onto itself before pulling it outward to form a crease as shown in FIG. 1.

Finally, simulated eyes are formed by weaving a tubular member 266 through an upper surface of the body 242, with outer ends of the tubular member extending outward from the top surface of the body 242. The ends of the tubular member 266 are cauterized by melting the ends of the tubular member 266 to form a generally enlarged, flattened area. A drop of black paint is applied to the flattened ends of the tubular member 266 to simulate an eye. Alternately, a flexible rod, not shown, is disposed in the member 266. Preferably, the rod is formed of black, 300 lb test monofilament fishing line which gives an appearance of black eyes at the ends of the member 266.

Figure 4:
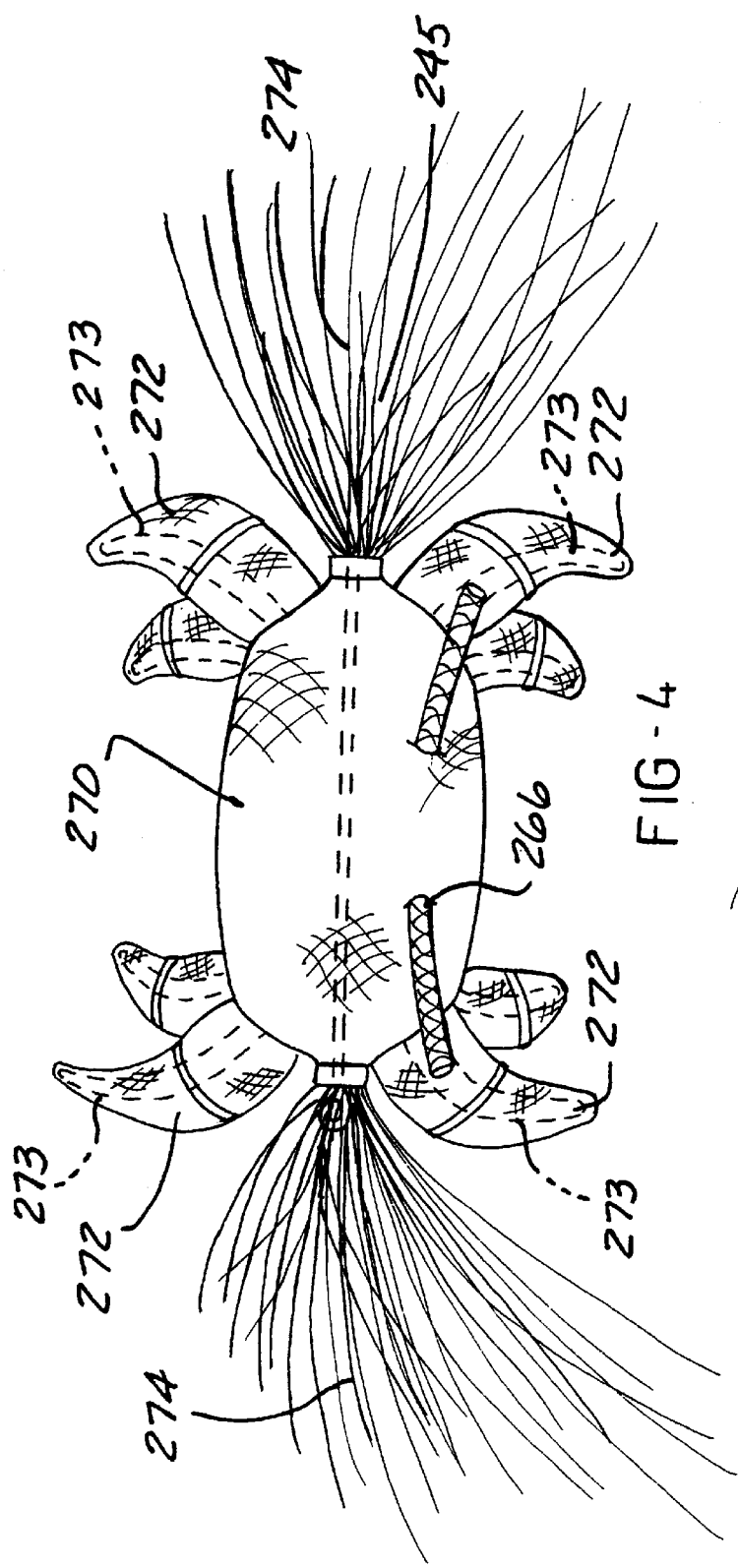
FIG. 4 is a plan view of another embodiment of an artificial crab according to the present invention.

A different species of crab is shown in FIG. 4. In this fly, a body 270 is formed substantially as the body described above in FIGS. 1–3 with eyes formed on the end of a tubular member 266. A hook 245 is joined to the underside of the body 270, preferably by inserting the shank 246 of the hook 245 through the interior of the body 270 prior to closing the ends of the body 270 about the shank 246 of the hook 245 by means of threads, as described above. In this simulated crab 270, four pairs of legs 272, with two pairs being larger than the other two pairs, are joined to the body 270 preferably by weaving through the body 270 in the manner described above. Each leg 272 has a shorter length flexible monofilament rod 273 extending between and joined to each end of each leg 272 to bend each leg 272 into a curved shape. Finally, feathers or fur 274 are joined to the body 270, preferably by attaching the ends of the feathers 274 to the ends of the body 270 prior to wrapping the thread around the end of the body 270.

Figure 5:
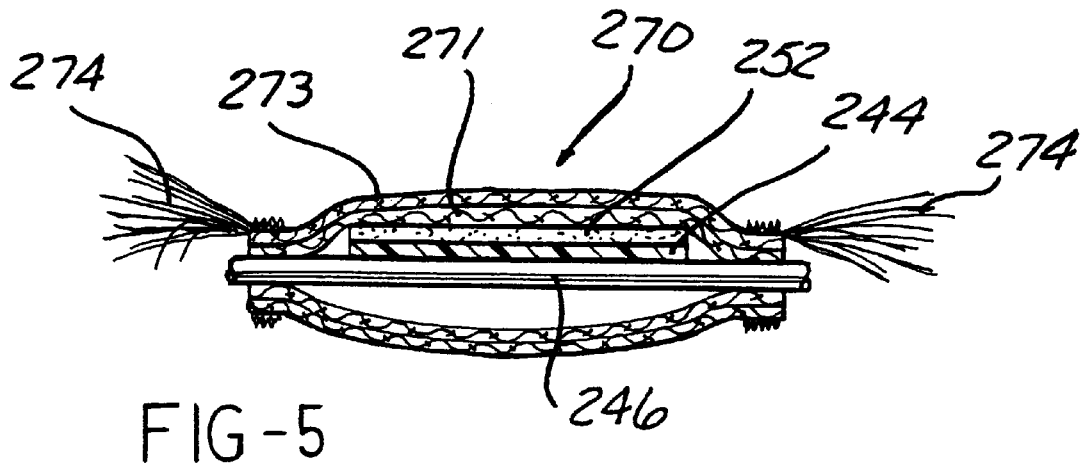
FIG. 5 is a cross-sectional view generally taken along line 5—5 in FIG. 3.

FIG. 5 depicts an alternate embodiment which may be employed for the body 270 or the body 242. In this embodiment, the body is formed by two layers of woven mesh material including a first inner layer 271 and a second outer layer 273. The layers 271 and 273 are preferably in the form of separate, woven mesh tubular members which are concentrically arranged by inserting one tubular member into the other tubular member. The outer ends of the tubular members or layers 271 and 272 are tied at opposite ends in the same manner described above and shown in FIGS. 1–4. Further, a rigid disk 244 and an optional foam or resilient pad 252 may be interposed between one side of the shank 246 and the inner layer 271.

This embodiment provides a double strength layer of woven mesh material for added tear resistance to the artificial fly or lure. Further, the tubular members forming the layers 271 and 273 may be selected of different colors to provide a different overall visible appearance for the artificial fly or lure since the color of the inner tubular inner layer 271 will be visible through the openings in the outer tubular mesh layer 273.

Figure 6:
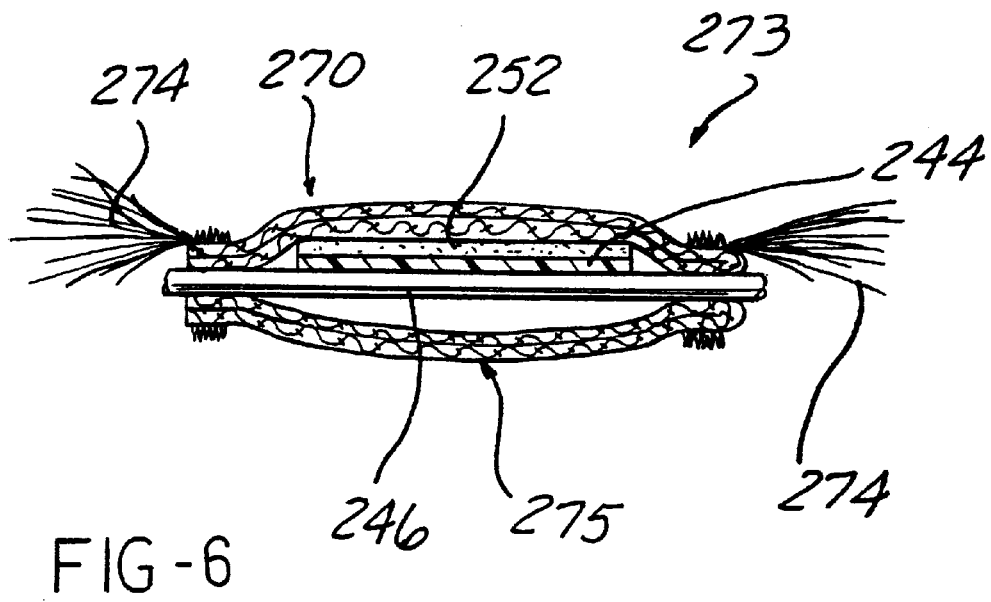
FIG. 6 is a cross-sectional view, similar to FIG. 5; but showing an alternate embodiment of the artificial crab shown in FIG. 4.

FIG. 6 depicts yet another embodiment which may be used to form the body 270 or the body 242. In this embodiment, a single tubular woven mesh member 275 is folded inward or outward from one end toward the opposite end to form a double layer as shown in FIG. 6. This also provides a double layer of woven mesh material for added tear resistance. As in the previous embodiments, a rigid disk 244 and an optional resilient or foam pad 252 may be interposed between the shank 246 and the inner surface of the double wall tubular member 275. Fur 274 is secured to the ends of the tubular member 275 by the threads.

Figure 7:
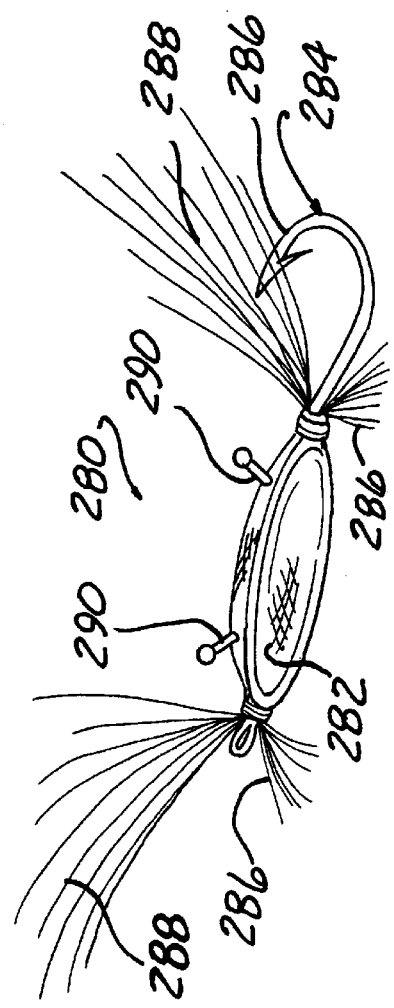
FIG. 7 is a bottom perspective view of yet another embodiment of an artificial crab according to the present invention.

In yet another artificial fly/lure 280 is shown in FIG. 7 a smaller species of crab is depicted. In this embodiment, the body 282 is hollow and receives only the shank of a hook 284 therethrough. Further, the bend and tip 286 of the hook 284 extends upward above the upper surface of the body 282.

Due to the small size of the body 282, a pair of legs 286 are formed as bent extensions of the ends of the body 282. Fur, feathers or synthetics 288 are joined to the ends of the body 282 by means of thread wrapped around the ends of the body 282 and the shank of the hook 284. Eyes 290 are joined to the body 282 by weaving an elongated tubular member through the upper surface of the body 282. The ends of the tubular member are melted to form an enlarged, spherical end which is painted black to simulate an eye. In this embodiment, the body 270 is hollow and does not include the rigid disk 244.

In the crab 280 shown in FIG. 7, the bottom surface of the body 282 is pressed inward forming a concave depression which adds rigidity to the overall shape of the body 282. Alternately, the body 282 may remain in a generally tubular, hollow form and a disk, such as a rigid disk 244 and an optional resilient or foam pad 252 may be interposed between the shank of the fish hook 284 and one surface of the body 282 to add rigidity yet flexibility to the overall shape of the body 282.

Figure 10:
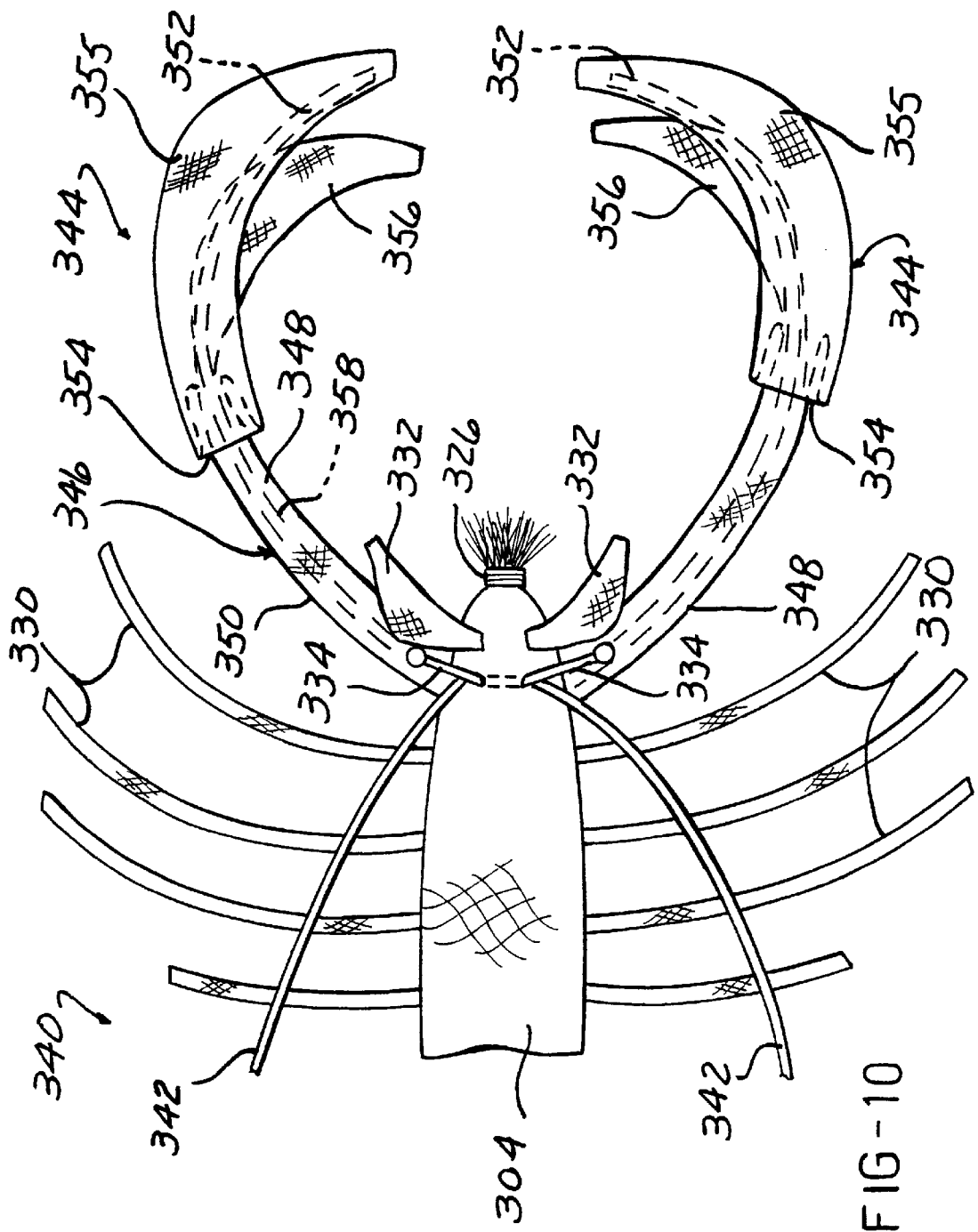
FIG. 10 is a partial view showing another embodiment of an American lobster constructed in accordance with the teachings of the present invention.

Referring now to FIGS. 8–10, there are depicted two embodiments of the use of a mesh body to form an artificial fly/lure which simulates the shape and appearance of an American lobster or a spiny lobster.

FIGS. 8 and 9 depict an artificial fly/lure 300 which simulates a spiny lobster. The body of the lobster 300 includes first and second body parts 302 and 304 which are joined to the shank 306 of a hook 308. The first or rear body part 302 is formed of the same woven mesh material described above. However, one end of the tubular mesh is folded in on itself as shown by reference number 310 to form a hollow interior cavity surrounding the shank 306 of the hook 308. A rigid disk 311 and an optional foam layer 313 may be interposed between the upper folded over portion of the first body part 302. A plurality of threads 312 wound around a portion of the first body part 306, adjacent to the eye 314 of the hook 308. An end portion 316 extends from the threads 312 as part of the first body part 302 and forms a tail. The second body part 304 is attached at one end to the shank 306 of the hook 308 by means of threads 320 as shown in FIG. 9. A similar rigid disk 305 and an optional foam pad 307 may be disposed within the second body part 304. The shank 306 of the hook 308 extends through a bottom part of the second body part 304 to the bend 322 and tip 324 which are spaced from the bottom surfaces of the first and second body parts 302 and 304. The other end of the second body part 304 is closed by means of a plurality of wound threads 326.

A plurality of legs 328 are mounted on the first body part 302. As in the preceding crab embodiments, the legs 328 are formed of an elongated tubular members of woven mesh material which are forced through openings in the first body part 302. Outer ends of each tubular member extend outward through the first body part 306 to form the legs 328. Similar legs 330 are mounted on the second body part 304. Also, a pair of horns 332 are mounted on the second body part 304 by forcing a single tubular member through the mesh of the second body part 304 and then compressing and melting the outer ends of the tubular member to form the horns 332 into the desired shape. A pair of eyes 334, shown in FIG. 9, are formed in the same manner and attached to the front end of the second body part 304. The enlarged end of the tubular member forming the eyes 334 may be colored black to simulate an eye. Finally, an elongated pair of antennae 336 are overlaid on the first end of the second body part 304 prior to applying the threads 326 about the first end of the second body part 304. Some or all of the legs 328 or 330, the horns 332 and the antenna 336 may have a flexible rod, not shown, extending therethrough, as described above, for rigidity as well as to shape the legs etc., into a curved shape FIG. 10 depicts a modification to the artificial fly/lure 300 in which an artificial fly/lure 340, having substantially the same construction as the artificial fly/lure 300 shown in FIGS. 8 and 9, has a shape which simulate the features of an American lobster.

In this embodiment, the second body part 304 also has a pair of eyes 334 and a pair of horns 332. A plurality of legs 330 are attached to the second body part 304 and project outward from opposite sides of the second body part 304. A pair of elongated antennae 340 and 342 are mounted on the second body part 304, by threading an elongated tubular mesh member through apertures in the mesh material forming the second body part 304 and then curving the ends rearward as shown in FIG. 10.

Two pairs of claws or pinchers denoted generally by reference number 344 are attached to the second body part 304. The pair of pinchers 344 are formed of a single tubular member 346 which is forced through the mesh in the bottom side of the second body part 304 and then curved outward to form first and second sections 348 and 350. A thin, elongated, shorter length, flexible rod 352 extends from end to end through the tubular member 346 and is joined to each end. A joint is formed in the tubular member 346 by forcing an immediate portion over on itself and then partially extending the folded over section outward to form a hollow cavity or crease 354. The outer end of each folded over portion is then sealed at an outer end to form an enlarged main claw 355 shown in FIG. 10.

The secondary claw 356 is formed by means of a smaller diameter tubular mesh member having closed outer ends which is bent into the shape of a smaller claw or pincher. After being forced through the main claw 355, the outer ends of the smaller mesh member are curved into pincers or claws by a shorter length rod 357 extending through and joined to each end of the secondary claw 356.

Various markings in the form of paint, colored markets, etc., can be applied to the outer surface of the bodies 300 and 340 to more accurately depict the coloring and scale design on a spiny or American lobster.

Referring now to FIGS. 11–15, there is depicted another aspect of the present invention in which the artificial fly or lure 10 is in the form of a squid.

Figure 11:
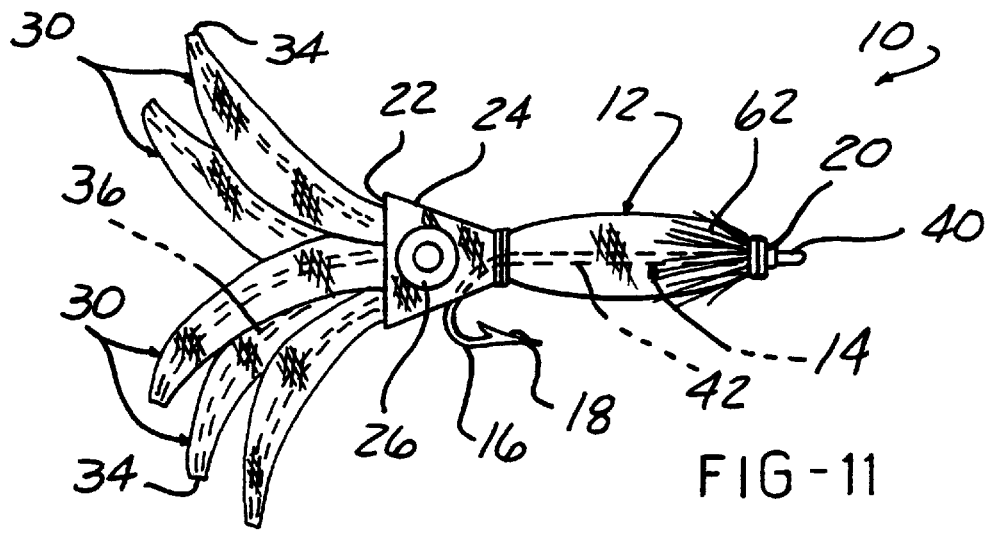
FIG. 11 is a side elevational view of another aspect of the present invention showing the artificial fly/lure in the shape of a squid.
Figure 12:
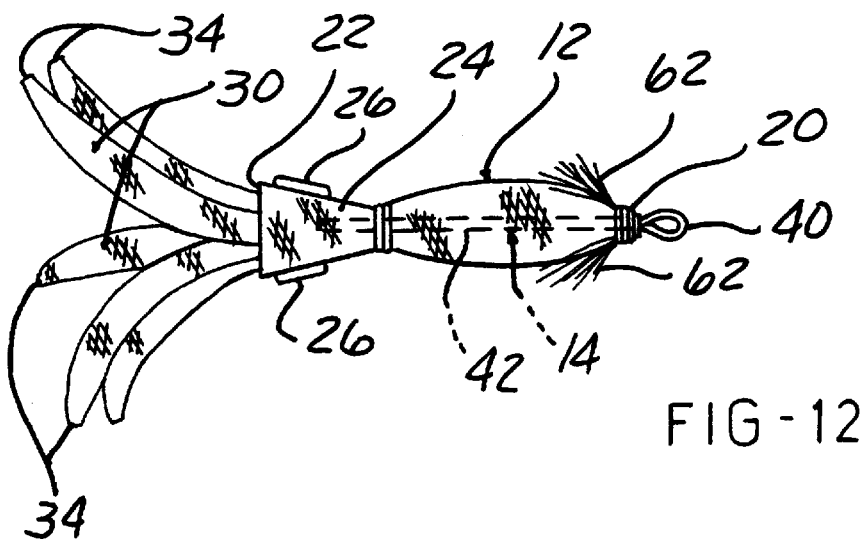
FIG. 12 is a top plan view of the artificial fly/lure shown in FIG. 11.

The squid 10 is formed of a body 12 which surrounds at least the shank of a hook denoted generally by reference number 14. A bend portion 16 and a tip portion 18 of the hook 14 project exteriorly of the body 12, generally adjacent one of the first and second ends 20 and 22 of the body 12, such as the second end 22 as shown in FIGS. 11 and 12. In a normal use position, the tip 18 and bend 16 project below the shank 14.

The squid 10 has a simulated naturally occurring squid shape in which the body 12 has a smoothly curved, hourglass shape extending from the first end 20 and a generally conical shaped head 24 at the second end 22. A pair of eyes 26 are mounted on the head 24.

Further, a plurality of tentacles or arms, hereafter referred to simply as "tentacles", extend from the second end 22.

The body 12 and each of the tentacles 30 is formed of a mesh material having an open weave of crisscrossed strands or members defining apertures therebetween which open to a hollow interior within the body 12 and a hollow interior within each tentacle 30.

Any suitable high strength yet flexible weave material may be employed for the body 12 and tentacles 30. By example only, in a preferred embodiment, the body 12 and tentacles are formed of a material sold under the tradename "Skuf-Jacket" by Bentley-Harris Manufacturing Co., Lionville, Pa. This material is sold in elongated cylindrical, tubular form which can be cut to an appropriate length. The material is available in at least three diameter sizes, with the smallest diameter having the tightest weave; i.e., the smallest openings between adjacent crisscross members; while the larger diameter has a more open, looser weave defined by larger apertures between the crisscrossed members.

In assembling the body 12 for use with the hook 14, the body 12 is cut to length forming the first end 20 and the second end 22. The first and second ends can be then cauterized to prevent it from unravelling. Each tentacle 30 is likewise cut to length forming a first end 32 and an opposed, second end 34.

The mesh material serves several important functions for the artificial fly/lure of the present invention. First, it provides a wear resistant outer layer for the artificial fly/lure which resists damage to the artificial fly/lure typically caused by the sharp teeth of game fish. Secondly, the openings or apertures between the crisscross weave members of each tentacle 30 allow water to move through the hollow interior of each tentacle 30. This, in conjunction with the flexible nature of each tentacle 30, provides a unique pulsating movement of each tentacle 30 as the fly or lure 10 is drawn through the water in a series of jerk-like movements, as described hereafter.

Each tentacle 30 is provided with the same or closely similar length as in a naturally occurring squid. Each tentacle 30 is cut to the desired length forming the first end 32 and the opposed second end 34.

A thin, flexible, rod 36 preferably formed of a monofilament fishing line, extends between and is joined to each of the first and second ends 32 and 34 of each tentacle 30. However, the rod 36 has a shorter length than the nominal length of the tentacle 30 which causes each tentacle 30 to bend generally into a smoothly curved shape between the first and second ends 32 and 34 as shown in FIGS. 11–15. At the same time, the rod 36 and the shape memory of each tentacle 30 enables each tentacle 30, despite being moved from its nominal curved position shown in FIGS. 11–15 when being drawn through the water, to return to its original shape when the pulling force is discontinued.

Figure 13:
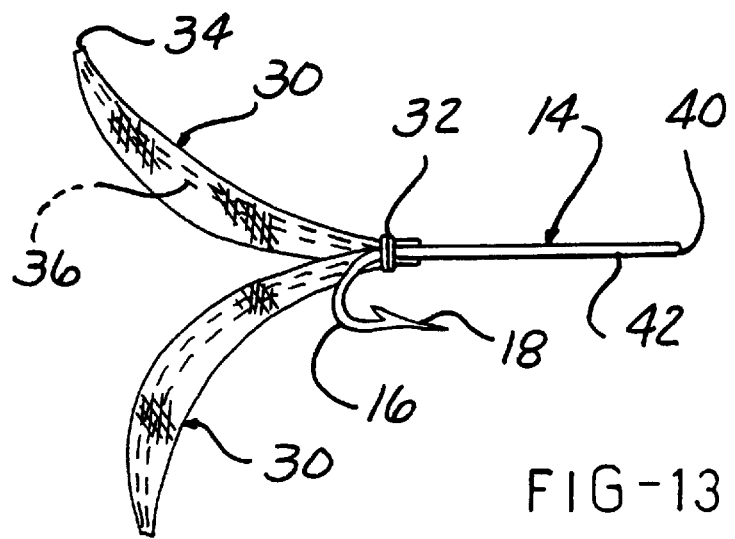
FIGS. 13–15 are side elevational, partially cross sectioned views, showing the steps employed in constructing the squid shown in FIGS. 11 and 12.
Figure 14:
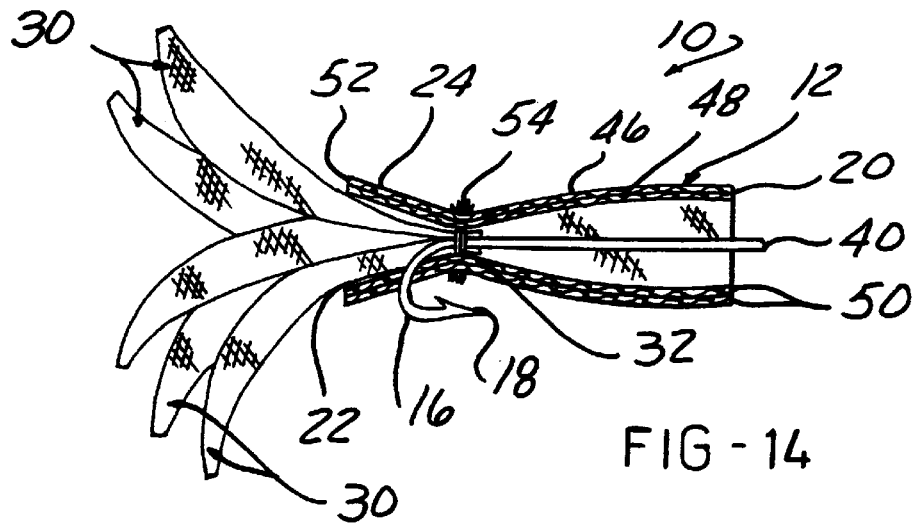
Figure 15:
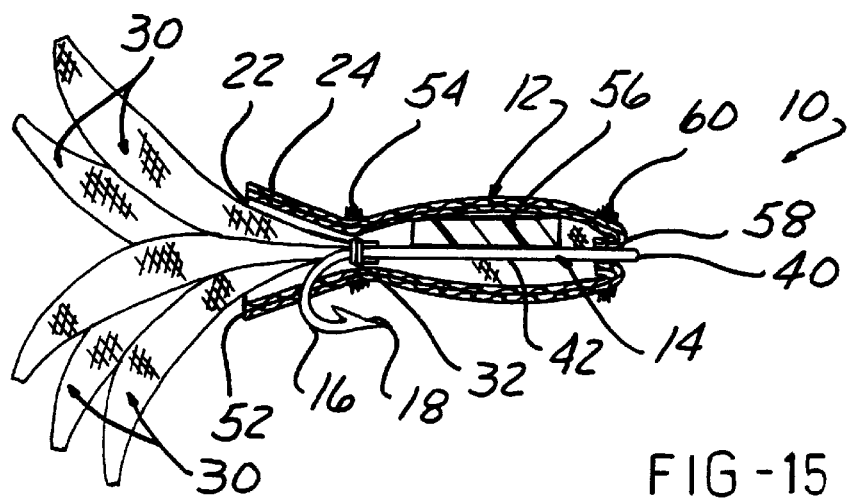

Further details concerning the unique features of the artificial fly or lure 10 of this aspect of the present invention may be had by referring to the FIGS. 13–15 which depict sequential steps in the construction or assembly of the artificial fly or lure 10.

The hook 14 may take the shape of any conventional fish hook. Generally, however, a typical fish hook, such as fish hook 14, includes an eye 40 at one end of an elongated, tubular shank 42. The bend 16 is formed at the opposite end of the shank 42 from the eye 40 and curves in any one of a number of different shapes to the tip 18.

A first step in constructing the artificial fly or lure 10 of the present invention is shown in FIG. 13 in which each tentacle 30 is fixedly secured at the first end 32 to the shank 42 at an intermediate position between the eye 40 and the beginning of the bend 16. The first end 32 of each tentacle 30 is secured to the shank 42 by means of a thread 32 wound in a number of tight turns about the first end 32 and the shank 42. Any number of tentacles 30 may be provided in the artificial fly 10 with the five tentacles 30 shown in FIGS. 13–17 being depicted by way of example only and representative of any number of tentacles 30 according to the present invention.

After all of the tentacles 30 are fixedly mounted at the respective first ends 32 to the shank 42, a quick dry adhesive is applied over the threads 32 to hold the threads 32 in place. The mesh body 12 is then disposed over the shank 42 from the eye 40 toward the tentacles 30. Although the body 12 could be provided in a single wall thickness, in one aspect of the present invention, the weave body 12 is folded over on itself to form a double outer wall thickness or layers 46 and 48 which extend between cut ends 50 and a smooth, curved, opposed non-cut end 52.

The body 12 is inserted over the shank 42 until the non-cut end 52 extends beyond the first ends 32 of the tentacles 30 secured to the shank 42. Next, the body 44 is tied at an intermediate position between the ends 50 and 52, generally closer to the non-cut end 52 as shown in FIG. 14. A thread 54 is wound tightly about the exterior of the body 12 to cinch or draw in the outer diameter of the body 12 and the tentacles 30 disposed within the interior of the body 12. An adhesive, such as a quick dry adhesive, is applied over the thread 54 to fixedly hold the thread 54 in the wound position.

The thread 54 divides the fly 10 into the body 12 and the head 24. As shown in FIGS. 11–15, the tightly wound thread 54 causes the head 24 of the body 12 to flare outwardly from the thread 54 in a generally conical shape in which the non-cut end 52 surrounds an opening through which the tentacles 30 project.

Next, in FIG. 15, an insert 56 which is preferably a lightweight, rigid insert, such as one formed of a closed cell material, i.e., styrofoam, by example only, is inserted into the interior of the body 12 through the opening formed by cut ends 50. The insert 56, which may take any form, in the example shown in FIG. 15, has an elongated oval peripheral shape which conforms the normally cylindrical shape of the body 12 into a similar oval shape more like the body of a natural squid.

Next, the cut ends 50 of the double wall thickness of the body 12 are folded in on themselves, as shown by reference number 58 in FIG. 15. A thread 60 is wound in a plurality of tight turns over the folded in end 58 as well as the shank 42 of the hook 14 to draw the first end 20 of the body 12 tightly around the shank 42 of the hook 14. A plurality of thread-like strips 62 are secured at a central point to the first end 20 by a separate wound thread over the thread 60. The ends of the strips 62 project oppositely outwardly from the first end 58 of the body 12 to simulate fins.

An adhesive, such as quick dry adhesive, is applied over the threads 60 and threads attaching the strips 62 to the first end of the body 12 to secure the threads and the strips 62 in position.

Figure 16:
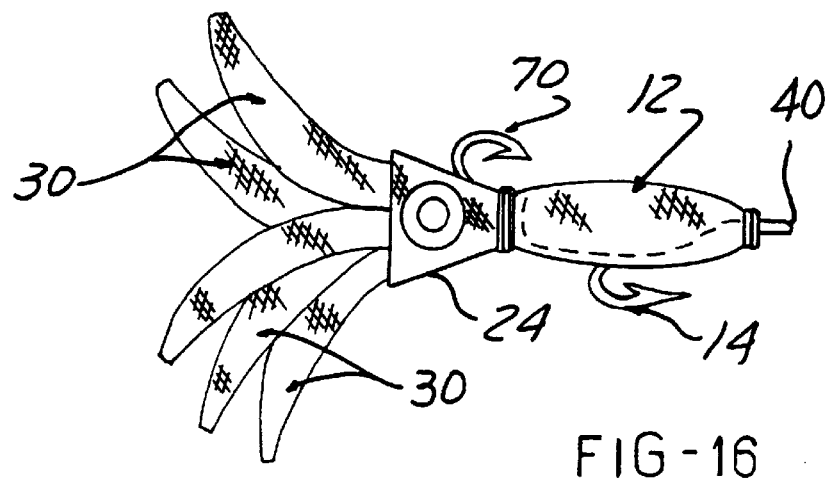
FIG. 16 is a side elevational view of the second aspect of the squid shown in FIG. 11.
Figure 17:
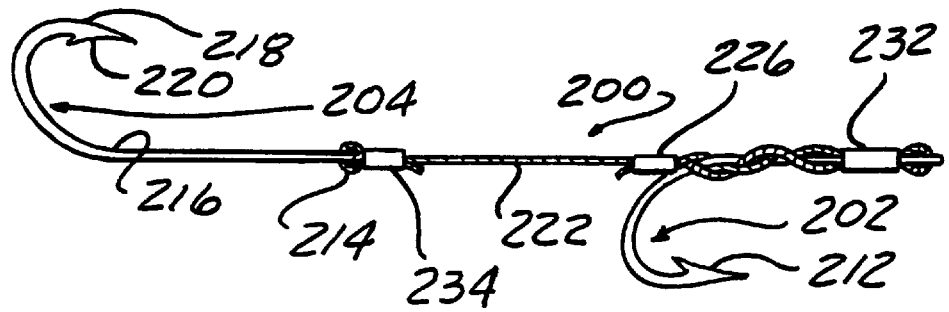
FIG. 17 is a side elevational view of a tandem in-line hook tying arrangement usable in the present invention.
Figure 18:
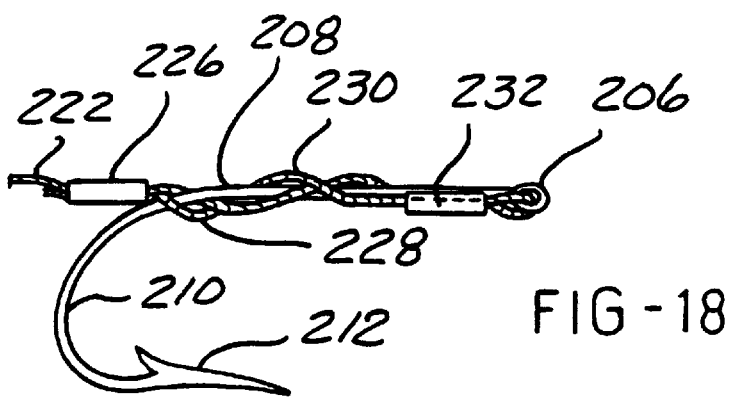
FIG. 18 is an enlarged view of the tying arrangement shown in FIG. 17.

Before describing the use of the artificial fly or squid 10 in the water, another aspect of the present invention is shown in FIGS. 16–18. In this example, the squid 10 is constructed in the same manner as described above except that the body 12 may have an overall longer length to accommodate two, tandem-arranged hooks, including the first hook 14 and a second hook 70. The bend and tip portions of each hook 14 and 70 project exteriorly of the body 12 in spaced apart locations along the body 12. In a preferred example, the tips of each hook 14 and 70 project from the body 12 in opposite directions.

Referring now to FIGS. 17 and 18, there is depicted another embodiment of the present invention 202 and 204 which are interconnected by a unique connection or tying means 200.

The hooks 202 and 204 may be identically constructed or differently constructed as well as being provided in practically size, shape, etc. For simplicity, the hook 202 will be defined as including and eye 206, an elongated shank 208, a bend 210 of any form and a tip 212, also of any conventional shape or form. The second hook 202 also has an eye 214, an elongated shank 216, a bend 218 and a tip 220.

The unique connection or tying arrangement interconnects the two hooks 202 and 204 such that the shanks 208 and 216, respectively, remain substantially axially in-line for straight pull along the two shanks 208 and 216 when a fish strikes the second hook 204.

The connection means 200 includes a single substantially non-elongatable cable 222. By way of example only, the cable 222 comprises a wound steel cable having an outer plastic coating.

A first end 224 of the cable 222 is fixedly mounted in a first crimp connector 226. The cable 222 extends from the first end 224 through at least one and preferably two interleaved or interwoven loops 228 and 230 about the shank 208 of the hook 202 between the first crimp connector 226 and the eye 206 of the first hook 202. In general, the section 228 extending from the first end 224 of the cable 222 passes under a portion of the other cable section 230. On the other side of the shank 208, the other section 230 also passes over a portion of the section 228 thereby forming, in a plan view, a figure eight between the eye 206 and the first connector 226. Portions of the sections 228 and 230 are also crimped by a second crimp connector 232 positioned adjacent the eye 206. Quick dry adhesive is used to fixably attach the first connector 232 to the shank 208 adjacent to the eye 206.

This figure eight-type wound connection of the cable 222 securely attaches the cable 222 to the first hook 202 while insuring that the cable 222 extends generally axially in-line from the shank 208 of the first hook 202.

The opposite end of the cable 222 passes through the eye 214 of the second hook 204 and returned into a fixed mount in a second crimp connector 234.

FIG. 17 also shows that both of the hooks 202 and 204 may be connected by the cable 222 such that the tips 212 and 220 project to the same side of the aligned shanks 208 and 216. Alternately, as shown in FIG. 11, the tip 220 of the second hook 204 may extend in an opposite direction from the aligned shanks 208 and 216 from the tip 212 of the first hook 202.

Various markings, made by permanent ink or other methods, may be applied to the body 12, the fins 62 and the tentacles 30 to simulate the patterns and coloration found in a natural squid. For example, dot-like markings are formed on the tentacles 30 to simulate the sucklers normally found on the tentacles or arms of a natural squid.

In use as a fly or lure, the squid 10 of the present invention is used in the normal manner by casting in the case of fly fishing or with conventional spinning or trolling gear. The hollow interior of the body 12 and the tentacles 30 allows water to pass through the body 12 and the tentacles 30 causing the squid 10 to gently and slowly drop through the water thereby providing an attractive target for other fish.

One unique feature of the squid 10 is the pulsating movement of the tentacles 30 when the squid 10 is drawn through the water by the fisherman in a series of short, fast, jerk-like movements of the fishing line attached to the eye 40 of the hook 14. Such movements cause water rushing over the tentacles 30 to bend the outer or free ends 34 of the tentacles 30 inward toward a central axis extending along the shank 42 of the hook 14. When the forward movement force is discontinued, the natural retained curvature of each tentacle 30 as well as the curved nature of the rod 36 mounted within each tentacle 30 causes the second ends 34 of each tentacle 30 to move radially outward from the central axis of the hook 14 to its normal outward curved position shown in FIGS. 11–15.

This pulsating movement is identical to that used by a natural squid in propelling itself through the water. Thus, the squid of the present invention has a shape and movement or action nearly identical to that of a natural squid.

Figure 19:
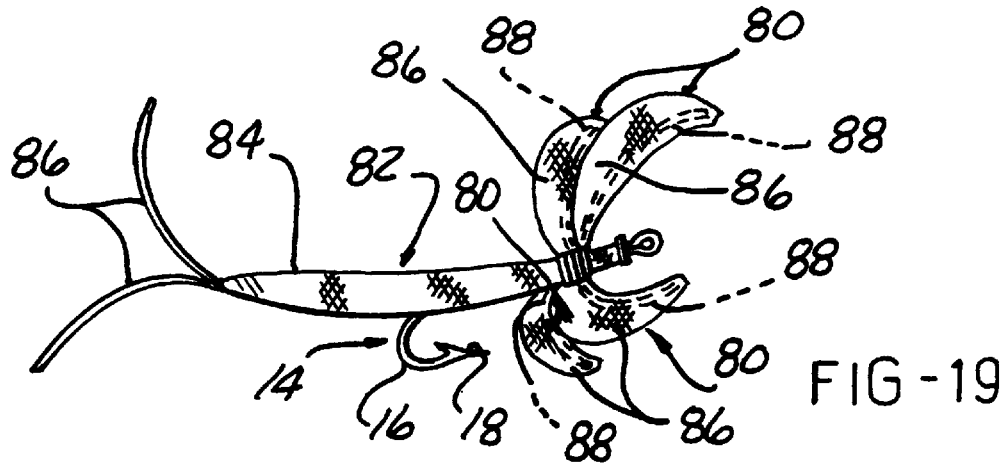
FIG. 19 is a side elevational view of yet another embodiment of the present invention in the form of a mayfly.

FIG. 19 depicts another aspect of the present invention in which the tension rods 36 employed in the tentacles 30 of the squid 10 are also employed in the wings 80 of an artificial fly or lure in the shape of an insect, preferably a Mayfly 82.

The insect or Mayfly 82 has an elongated body 84 formed of woven mesh material. The hook 14 is mounted in the body 84 in the same manner as described above for the squid 10, with the bend 16 and tip 18 projecting downwardly below the body 84 in a normal use position of the Mayfly 82. A closed cell semi-rigid insert, such as an insert formed of styrofoam, not shown, is disposed interiorly within the body 84 between the interior surface of the body 84 and the upper portion of the shank of the hook to conform the body 84 to the desired elongated, generally cylindrical shape of a natural Mayfly. One or two short length of monofilament fishing lines 86 are attached to the tail or rear end of the body 84 to simulate a tail.

At least one pair and, preferably, a plurality of pairs of two opposed wings 86 are mounted on the body 84 in a manner similar to that used to form the legs of the crabs described above. Each separate wing 86 is formed of elongated mesh material having ends which are closed, such as by cauterization. Each pair of wings 86 is formed by tying a single tubular mesh member at a middle point to the body 84 to form two opposed, substantially equally sized and identically shaped wings 86. The frontmost pair of wings 86 can be larger than the rear pair of wings 86. A tensioning rod 88 having a length shorter than the overall length of the tubular member forming each pair of wings 86 is joined at opposite ends to the ends of each pair of wings 86 to cause each wing 86 to take a curved shape.

Figure 20:
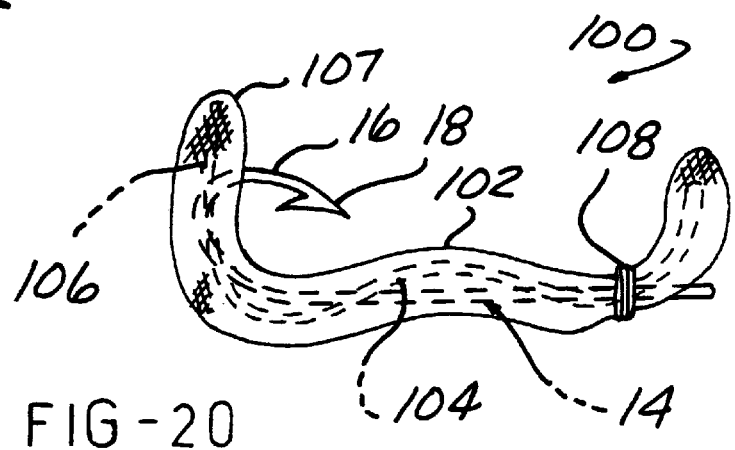
FIG. 20 is a side elevational view of a night crawler fly/lure according to the present invention.

FIG. 20 depicts a night crawler or worm 100 also constructed in accordance with the teachings of the present invention. In this aspect, the worm 100 includes an elongated hollow body 102 formed of a woven mesh material having criss-cross strands defining apertures opening to a hollow interior of the body 100. A flexible rod 104 is inserted through the hollow body 102. A first end 106 of the rod 104 is cauterized or otherwise fixedly attached to a first end 107 of the body 102. The body 102 and rod 104 are then twisted about the longitudinal axis at various locations along the length of the body 102 to form a curved, irregular shape for the body 102 and rod 104 which closely simulates a natural night crawler or worm. The body 102 and rod 104 retain the twisted shape. Next, a hook 14 is inserted through a bend in the body 102 with the bend 116 and tip 18 of the hook forced through the mesh forming the body 102. A thread 108 is tightly wound in a plurality of turns about the end of the shank of the hook 14 at the bend in the body 102 to securely form the body 102, the rod 104 and the hook together. The buildup of the turns of the thread 108 simulates a wedding band or enlarged ring typically found on night crawlers. The buoyancy of the body 102 and the outward turned ends of the body 102 cause the fly or lure 100 to ride in water tip point up as shown in FIG. 20.

In summary, the present invention uses a tubular, woven mesh material to form bodies and other appendages of an artificial fly/lure which simulates a naturally occurring squid or insect.

What is claimed is:

1. An artificial fly comprising:

a hook having a shank, an eye formed at one end of the shank, and a bend and a tip formed at an other end of the shank;

a body having first and second opposed ends;

the shank disposed in the body with the bend and tip extending outward from one of said first and second opposed ends of the body and the eye of the shank extending outward from the other end of said first and second opposed ends of the body; and a plurality of movable, tubular arms extending from the other end of said first and second opposed ends of the body, the arms formed of a continuous, open mesh of crisscrossed strands with apertures therebetween opening to a hollow interior within each arm.

2. The artificial fly of claim 7 further comprising:

a flexible rod extending through each of the arms, opposite ends of the rod fixed to opposite ends of each arm.

3. The artificial fly of claim 2 wherein:

the flexible rod has a length shorter than a nominal length of the arm to bend the arm into a curved shape between the opposite ends.

4. The artificial fly of claim 1 wherein:

each of the arms are fixedly mounted at a first end to the shank of the hook.

5. An artificial fly comprising:

a hook having a shank, an eye formed at one end of the shank, and a bend and a tip formed at an other end of the shank;

a hollow body with sidewalls formed of a continuous open mesh of crisscrossed strands with apertures therebetween opening to a hollow interior of the body;

the shank disposed in the body with the bend and tip extending outward from one end of the body and the eye of the shank extending outward from an other end of the body; and a plurality of movable, tubular arms extending from the one end of the body, the arms formed of a continuous, open mesh of crisscrossed strands with apertures therebetween opening to a hollow interior within each arm.

6. The artificial fly of claim 5 further comprising:

a flexible rod extending through each of the arms, opposite ends of the rod fixed to opposite ends of each arm.

7. The artificial fly of claim 6 wherein:

the flexible rod has a length shorter than a nominal length of the arm to bend the arm into a curved shape between the opposed ends.

8. The artificial fly of claim 5 wherein:

each of the arms are fixedly mounted at a first end to the shank of the hook.

9. The artificial fly of claim 5 wherein:

the body is tied at the other end to the shank of the hook adjacent to the eye of the hook; and the body is tied to the shank at an intermediate portion of the body spaced from the one end of the body.

10. The artificial fly of claim 5 further comprising:

an insert disposed within the body, between the body and the shank of the fish hook, the body conforming to the shape of the insert.

\* \* \* \* \*